(12) United States Patent
Gould et al.

(10) Patent No.: US 11,926,277 B1
(45) Date of Patent: Mar. 12, 2024

(54) KNEE AIRBAG

(71) Applicant: ZF Passive Safety Systems US Inc., Washington, MI (US)

(72) Inventors: Douglas Gould, Lake Orion, MI (US); Joseph Palazzolo, Shelby Township, MI (US); Jaime Perez, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/983,631

(22) Filed: Nov. 9, 2022

(51) Int. Cl.
*B60R 21/206* (2011.01)
*B60R 21/01* (2006.01)
*B60R 21/2338* (2011.01)

(52) U.S. Cl.
CPC ........ *B60R 21/206* (2013.01); *B60R 21/2338* (2013.01); *B60R 2021/01013* (2013.01)

(58) Field of Classification Search
CPC .......................... B60R 21/206; B60R 21/2338
See application file for complete search history.

(56) References Cited

U.S. PATENT DOCUMENTS

| | | | | |
|---|---|---|---|---|
| 7,878,540 B2* | 2/2011 | Takimoto | ............. | B60R 21/233 280/743.1 |
| 8,220,830 B2* | 7/2012 | Takimoto | ............. | B60R 21/206 280/743.2 |
| 8,540,276 B2* | 9/2013 | Schneider | ............. | B60R 21/237 280/743.1 |
| 8,696,020 B2* | 4/2014 | Tanaka | .................. | B60R 21/233 280/743.1 |
| 8,814,201 B2* | 8/2014 | Webber | ................. | B60R 21/206 280/743.2 |
| 10,351,091 B2* | 7/2019 | Abe | ...................... | B60R 21/2334 |
| 10,525,924 B2* | 1/2020 | Abe | ........................ | B60R 21/26 |
| 10,953,840 B2* | 3/2021 | Rutgersson | ........... | B60R 21/015 |
| 2005/0206138 A1* | 9/2005 | Breuninger | ........... | B60R 21/233 280/730.2 |
| 2006/0202452 A1* | 9/2006 | Breed | ..................... | B60R 21/264 280/730.2 |
| 2019/0241145 A1* | 8/2019 | Hiruta | .................... | B60R 21/207 |
| 2023/0094687 A1* | 3/2023 | Perales-Huerta | ..... | B60R 21/201 280/728.3 |

\* cited by examiner

*Primary Examiner* — Paul N Dickson
*Assistant Examiner* — Tiffany L Webb
(74) *Attorney, Agent, or Firm* — TAROLLI, SUNDHEIM, COVELL & TUMMINO L.L.P.

(57) ABSTRACT

A knee airbag includes a cushion portion, which includes overlying panels interconnected along a perimeter connection to define an inflatable volume of the knee airbag. The panels are interconnected within the perimeter connection along one or more interior connections that define inflatable chambers within the inflatable volume. The knee airbag also includes a tether connected to an exterior surface of the cushion portion at spaced locations. The tether has a length that is shorter than the distance between the locations on the cushion portion to which the tether is connected. The tether is configured to become tensioned in response to inflation of the cushion portion and causing a bend to form in the cushion portion.

17 Claims, 3 Drawing Sheets

KNEE AIRBAG

TECHNICAL FIELD

This disclosure relates to an apparatus for helping to protect an occupant of a vehicle upon the occurrence of an event, such as a vehicle collision. More particularly, this disclosure relates to a knee airbag.

BACKGROUND

It is known to deploy an inflatable vehicle occupant protection device, such as an airbag, upon the occurrence of an event for which occupant protection is desired, such as a vehicle collision or rollover. The airbag is part of a conventional vehicle occupant protection apparatus that includes a sensor and an inflation fluid source, such as an inflator. Upon sensing the occurrence of an event for which deployment of the airbag is desired, the inflation fluid source is actuated and produces inflation fluid that inflates the airbag, causing it to deploy into the vehicle occupant compartment to help protect the vehicle occupants.

One particular type of inflatable vehicle occupant protection device is a knee airbag. Knee airbags are typically stored in a housing that is mounted in the lower portion of the instrument panel, in the area of the foot well. Knee airbags are inflatable to a deployed condition in which the knee airbag is positioned between the occupant's legs and the instrument panel to help protect the vehicle occupant from injury, particularly to the occupant's legs.

SUMMARY

A knee airbag includes a cushion portion, which includes overlying panels interconnected along a perimeter connection to define an inflatable volume of the knee airbag. The panels are interconnected within the perimeter connection along one or more interior connections that define inflatable chambers within the inflatable volume. The knee airbag also includes a tether connected to an exterior surface of the cushion portion at spaced locations. The tether has a length that is shorter than the distance between the locations on the cushion portion to which the tether is connected. The tether is configured to become tensioned in response to inflation of the cushion portion and causing a bend to form in the cushion portion.

According to one aspect, the chambers can be configured to extend along a longitudinal dimension of the cushion portion. The knee airbag can be configured so that the longitudinal dimension of the cushion portion extends vertically in the vehicle when inflated.

According to another aspect, the tether can be configured to form the bend transverse to the longitudinal dimension of the cushion portion.

According to another aspect, the cushion portion can include a front panel configured to face the occupant and a rear panel configured to face the instrument panel. The exterior surface to which the tether is connected can be an exterior surface of the rear panel.

According to another aspect, the bend in the cushion portion can be configured so that the cushion portion follows a contour of the instrument panel.

According to another aspect, the bend in the cushion portion can define first and second segments of the cushion portion on opposite sides of the bend that extend at an angle to each other. The bend can be configured so that the first segment follows a first portion of the instrument panel, and the second segment follows a second portion of the instrument panel.

According to another aspect, the first and second portions of the instrument panel can be generally flat surfaces of the instrument panel that extend at an angle to each other.

According to another aspect, the first and second portions of the instrument panel can be portions of a curved surface of the instrument panel.

According to another aspect, the bend can be configured to be positioned where the first and second portions of the instrument panel meet.

According to another aspect, the cushion portion can have a generally rectangular configuration and the interior connections can interconnect the front and rear panels to form the chambers.

According to another aspect, the cushion portion can have a one-piece woven construction in which the front and rear panels are woven simultaneously. The perimeter connection and interior connections can be defined by interwoven portions of the front and rear panels.

According to another aspect, the cushion portion can have an assembled construction in which the front and rear panels are separately woven panels that are interconnected along the perimeter and interior connections by at least one of stitching, welding, and adhesive connections.

According to another aspect, the tether can be a first tether and the bend can be a first bend. The knee airbag can also include a second tether connected to the exterior surface of the cushion portion at spaced locations. The second tether can have a length that is shorter than the distance between the locations on the cushion portion to which the second tether is connected. The second tether can be configured to become tensioned when the cushion portion is inflated and to form a second bend in the cushion portion spaced from the first bend.

According to another aspect, the first and second bends in the cushion portion can be configured so that the cushion portion follows a contour of the instrument panel.

According to another aspect, the first and second bends in the cushion portion can define first, second, and third segments of the cushion portion that extend at an angles to each other. The bends can be configured so that the first segment follows a first portion of the instrument panel, the second segment follows a second portion of the instrument panel, and the third segment follows a third portion of the instrument panel.

According to another aspect, a knee airbag module can include the knee airbag, an inflator for inflating the knee airbag, and a housing for supporting the knee airbag and inflator. The housing can include an opening through which the knee airbag deploys, and can be configured to be mounted in a vehicle instrument panel in the area of a footwall of the vehicle.

According to another aspect, a vehicle safety system can include the knee airbag module, a sensor configured to sense the occurrence of an event for which deployment of the knee airbag is desired, and a controller configured to actuate the inflator to deploy the knee airbag in response to the sensor.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Figure 1:
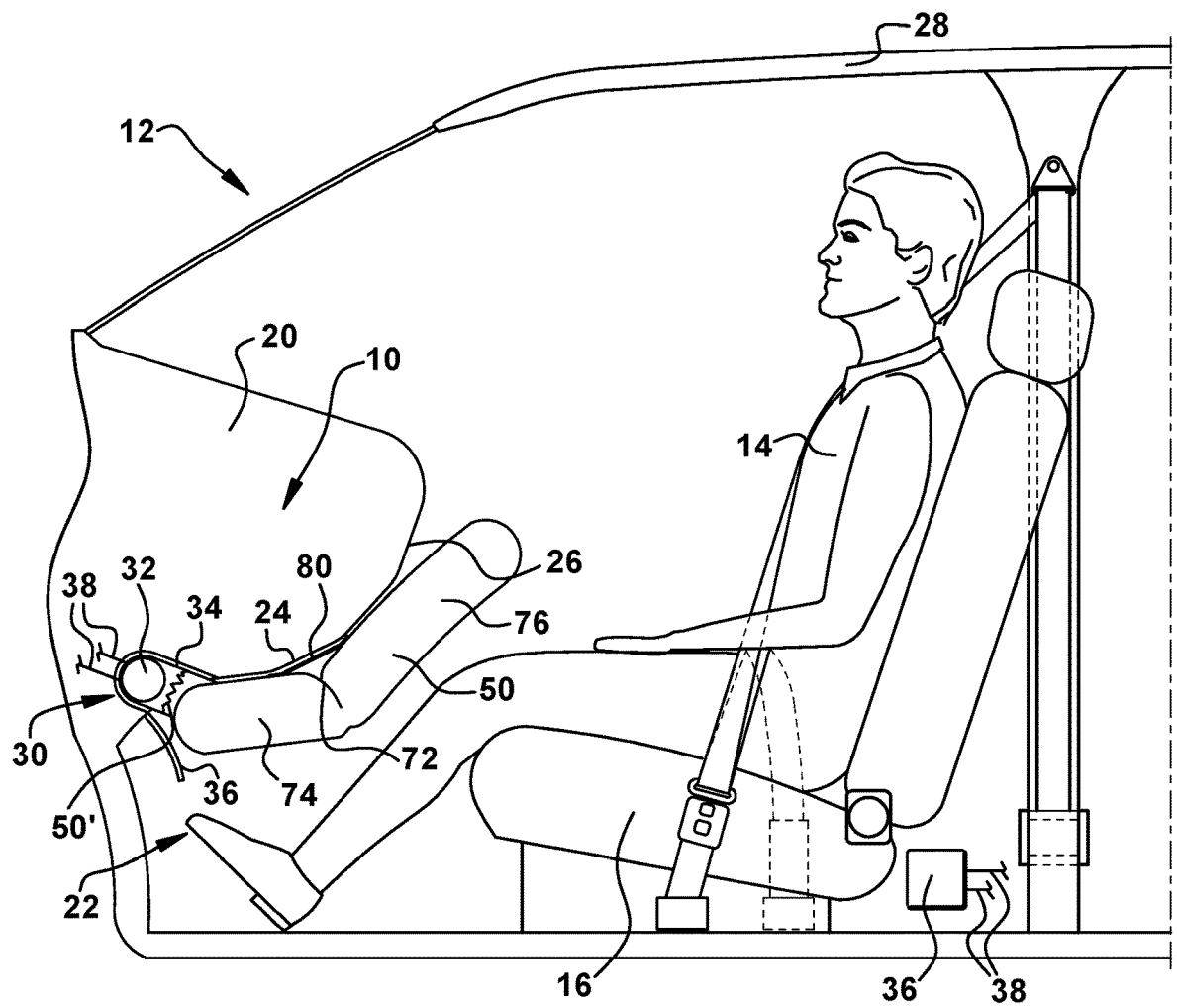
FIG. 1 is a side view that illustrates schematically a vehicle safety system including an apparatus for helping to protect an occupant of a vehicle.

A vehicle safety system 10 for helping to protect an occupant 14 of a vehicle 12 is shown in FIG. 1. The safety system 10 includes an apparatus in the form of a knee airbag module 30 that includes an inflatable knee airbag 50, an inflator 32 for inflating the knee airbag 50, and a housing 34 for supporting the knee airbag and inflator. The knee airbag module 30 is configured to be connected to an instrument panel 20 of the vehicle 12 adjacent or near a footwell 22 of the vehicle.

In the embodiment illustrated in FIG. 1, the knee airbag module 30 is a passenger knee airbag module configured to help protect the occupant 14 on a passenger side seat 16 of the vehicle 12. Those skilled in the art will appreciate that the system and apparatus 10 disclosed herein could be adapted for a driver side or center seated vehicle occupant (not shown) or occupants of rearward rows of the vehicle 12, such as a 2nd row, 3rd row, etc., of the vehicle (not shown).

The knee airbag 50 has a stored condition, indicated by dashed lines in FIG. 1 at 50', in which the knee airbag is folded and placed in the housing 34. The housing 34 helps contain and support the knee airbag 50 and inflator 32 in the instrument panel 20. The knee airbag module 30 is concealed in the instrument panel 20, for example, by a cover 36 in the form of a door or panel that is a component of the module itself, a portion of the instrument panel, a trim piece of the instrument panel, or a combination of these components.

The inflator 32 is actuatable to provide inflation fluid to an inflatable volume of the knee airbag 50 to deploy the knee airbag to the inflated condition, which is shown in solid lines in FIG. 1. The inflator 32 may be of any known type, such as a solid propellant or stored gas design, or a hybrid design implementing both solid propellant and stored gas. The safety system 10 includes a sensor, illustrated schematically at 36, for sensing an event for which inflation of the knee airbag 50 is desired, such as a collision. The inflator 32 is operatively connected to the sensor 36 via lead wires 38.

The knee airbag 50 can be constructed of any suitable material, such as a woven nylon (e.g., nylon 6-6), and may be constructed in any suitable manner. For example, the knee airbag 50 may include one or more pieces or panels of material. If more than one piece or panel is used, the pieces or panels may be interconnected by known means, such as stitching, ultrasonic welding, heat bonding, or adhesives, to form the knee airbag 50. The knee airbag 50 may be uncoated, coated with a material, such as a gas impermeable urethane, or laminated with a material, such as a gas impermeable film. The knee airbag 50 thus may have a gas-tight or substantially gas-tight construction. Those skilled in the art will appreciate that alternative materials, such as polyester yarn, and alternatives coatings, such as silicone, may also be used to construct the knee airbag 50.

Figure 2:
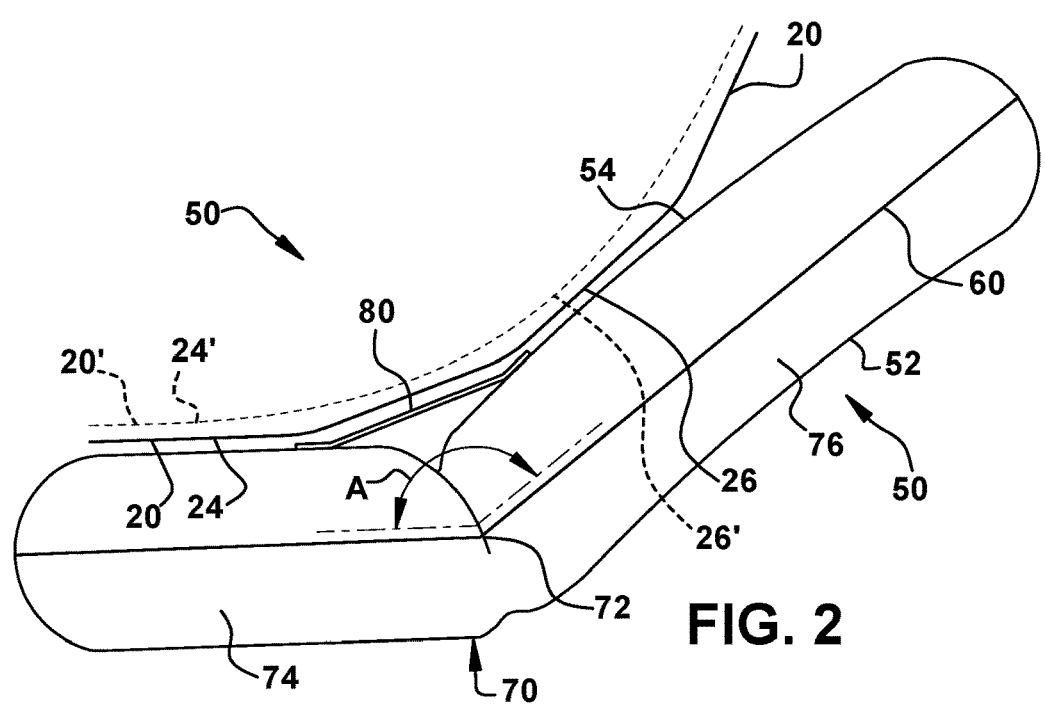
FIG. 2 is a side view of the knee airbag of FIG. 2.
Figure 3:
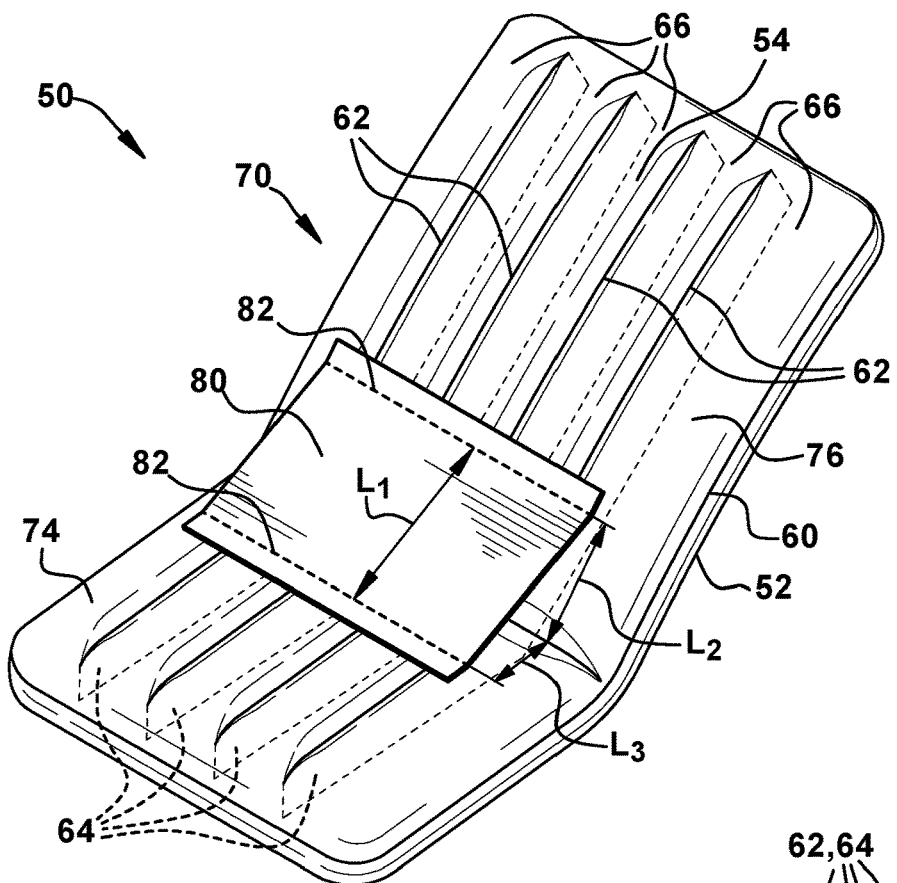
FIG. 3 is a rear perspective view of a knee airbag that forms a portion of the vehicle safety system, according to an example configuration.
Figure 4:
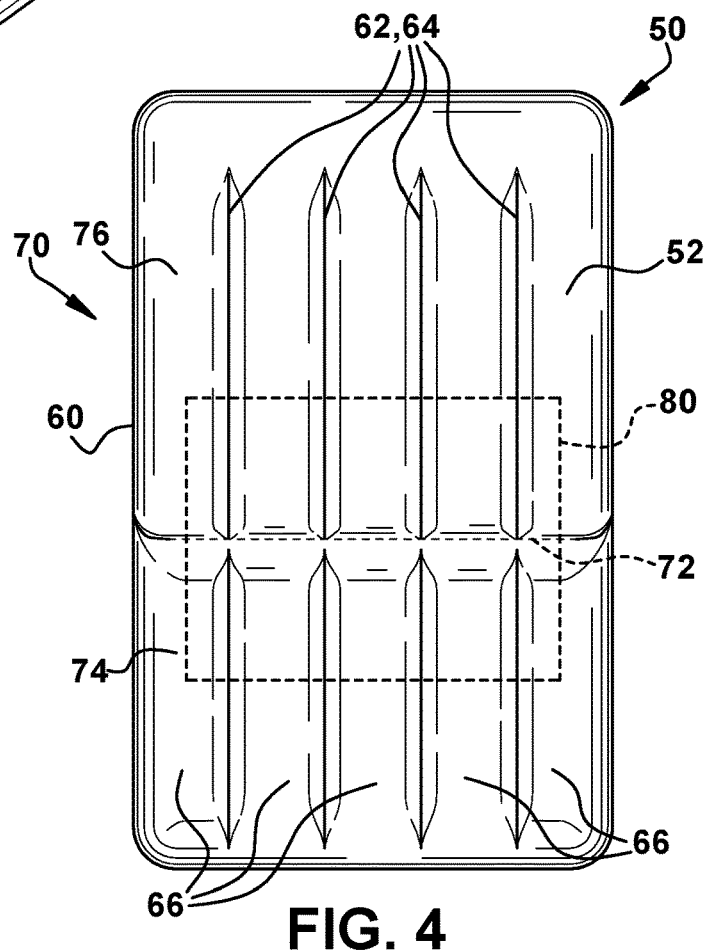
FIG. 4 is a front view of the knee airbag of FIG. 2.

The knee airbag 50 is illustrated in FIGS. 2-4. As shown in these figures, the knee airbag 50 has a simple construction, with a front panel 52 configured to face the occupant 14 and a rear panel configured to engage the instrument panel 20. The front and rear panels 52, 54 are interconnected about a peripheral connection 60, such as a stitched, adhesively connected, or welded seam. Within the periphery, the panels 52, 54 can be interconnected at one or more interior connections 62, such as a direct panel-to-panel connection via a stitched, adhesively connected, or welded seam, or via a tether 64 connected to both the front panel and rear panel, again via a stitched connection, adhesive connection, or welded connection. In the case of a tether 64 it can have a simple construction, such as an elongated rectangular configuration. Regardless of the construction, the interior connections 62 help limit the expansion of the panels 52, 54, control the inflated thickness of the knee airbag 50, as measured between the front and rear panels, and define inflatable chambers 64 of the knee airbag.

In one particular configuration, the knee airbag 50 can have what is referred to as a one-piece woven (OPW) construction in which the overlying panels 52, 54 are woven simultaneously, and are interwoven to form the perimeter connection 60 and the interior connections 62. The OPW knee airbag 50, including the connections 60, 62, and the inflatable chambers 64, can be formed in a single weaving step.

As shown in FIGS. 2-4, the interior connections 62 are longitudinal in nature, meaning that they are configured to lie in vertical planes that extend lengthwise in the vehicle 12. From the perspective of the seated occupant 14, the interior connections 62 extend vertically, in the manner shown, for example, in FIG. 4. The vertically extending interior connections 62 help define the vertically extending inflatable chambers 64 of the knee airbag 50. This construction is simple in that it implements overlying flat panels 52, 54 with a peripheral connection 60 extending about their peripheries. Additionally, connecting the front and rear panels 52, 54 with internal connections 62 formed either from simple connections between the front and rear panels (e.g., stitching, adhesives, or welds) or generally uniform tethers (e.g., elongated rectangular) to control the thickness of the bag and provide inflatable chambers 64, is simple and inexpensive to produce in comparison with more complicated constructions.

The cushion portion 70 of the knee airbag 50, that is, the interconnected front and rear panels 52, 54 along with the internal connections (seams/tethers) has a naturally inflated configuration that can be similar in nature to that of an air mattress. That is, in its naturally inflated state, the cushion portion 70 can be generally rectangular (see, e.g., FIG. 4) and have a substantially uniform thickness, controlled by the interior connections 62. This construction represents amongst the simplest of manners in which to achieve a cushion with a substantially uniform thickness. The cushion portion could, however, depart from the illustrated rectangular configuration without adding any significant complexity to the design. The cushion portion could, for example, have a tapered (e.g., trapezoidal) configuration or a rounded (e.g., elliptical) configuration.

The distance between the instrument panel 20 and the occupant 14 can depend on factors such as the size of the occupant, the forward/rearward position of the vehicle seat 16, and the architecture of the vehicle 12. To help ensure that the knee airbag 50 affords to the occupant the maximum level of protection, it is important that the bag deploys along the contour of the surface of the instrument panel 20. The contour of the instrument panel 20 can, however, be complicated, with curved surfaces and/or flat surfaces that extend in different angles/directions. For example, in FIG. 1, the instrument panel 20 has a first surface 24 that extends at a first angle, generally upward and rearward in the vehicle 12, toward the occupant 14. A second surface 26 intersects the first surface 24 and extends at a second angle, generally steeper direction, upward and rearward toward the vehicle roof 28.

To configure the cushion portion 70 of the knee airbag 50 to follow the contour of the instrument panel 20 along the first and second surfaces 24, 26 could require a more complicated construction with modified front and rear panels, the addition of curved/angled side panels, and a modified and/or more complicated tether configuration. Advantageously, however, the knee airbag includes one or more external tethers 80 that control the shape of the cushion portion 70 so that it follows the contour of the instrument panel 20 simply and without undue complexity.

Referring to FIGS. 2-4, the tether 80 is large, rectangular, and spans the width, or a significant portion thereof, of the cushion portion 70. The tether 80 is connected to the rear panel 54 along tether connections 82 that extend widthwise across the tether and the cushion portion 70. The tether connections 82 can, for example, be stitched connections, adhesive connections, or welded connections.

The tether 80 has a length $L_1$ that is shorter than the length of the rear panel 54 between the tether connections 82, which is the sum of the lengths $L_2$ and $L_3$ shown in FIG. 2. As a result of this length differential, when the knee airbag 50 is inflated, the tether 80 becomes tensioned, which restricts the rear panel 54 from fully assuming the normally flat configuration of the cushion portion 70. As a result, in the fully inflated and deployed condition of the knee airbag 50, the tether 80 causes a bend 72 to form in the cushion portion 70. First and second segments 74, 76 of the cushion portion 70 are defined on opposite sides of the bend 72, and extend away from the bend at an angle A.

The location of the bend 72, the respective lengths of the cushion segments 74, 76, and the angle A between the cushion segments, are determined by the length of the tether 80 and the locations of the tether connections 82. The location of the bend 72 will, in general, occur at or near the midpoint between the tether connections 82. The angle A depends on the difference between the tether length $L_1$ and the distance $L_2+L_3$ between the tether connections 82. The tether length $L_1$ is, by definition, shorter than the tether connection distance $L_2+L_3$. Otherwise, a bend will not form. With this in mind, it can be seen that the bend angle A can be decreased, i.e., making the bend more steep or sharp, by decreasing the tether length $L_1$ and/or increasing the tether connection distance $L_2+L_3$. Conversely, the bend angle A can be increased, i.e., making the bend more flat, by increasing the tether length $L_1$ and/or decreasing the tether connection distance $L_2+L_3$.

Advantageously, through the configuration of the tether 80, the knee airbag 50 can be configured to follow the contour of the instrument panel 20. As shown in FIG. 1, the bend 72 produced by the tether 80 causes the first segment 74 of the cushion portion 70 to follow the first portion 24 of the instrument panel 20, and the second segment 76 of the cushion portion to follow the second portion 26 of the instrument panel. The bend 72 is positioned where the first and second portions 24, 26 meet each other. The manner in which the segments 74, 76 of the cushion portion 70 follow their respective portions 24, 26 of the instrument panel 20 does not necessarily correspond exactly or precisely with the contour of the instrument panel. The cushion portion 70 does, however, follow the contour of the instrument panel 20 in a manner sufficient to maintain a close spacing sufficient to ensure that the knee airbag 50 can inflate and deploy completely, without being blocked or otherwise obstructed, such as by an occupant 14 positioned close to the instrument panel at the time of deployment.

Additionally, the contour of the instrument panel 20 need not necessarily include distinct portions 24, 26 that are essentially flat and extend at an angle with each other. For instance, referring to FIG. 3, the instrument panel can have a curved contour as shown in dashed lines at 20'. In this instance, the portions covered by the segments 74, 76 can be portions 24', 26' of the curved contour of the instrument panel 20'. In this instance, the portions 24', 26' of the curved contour of the instrument panel 20' can be defined or delineated by the bend 72 in the cushion portion 70.

The example configuration of the knee airbag 50 illustrated in FIGS. 1-4 depicts a cushion portion 70 with a single tether 80 configured to form a single bend 72 in the cushion. Additional tethers, forming additional bends, can be implemented. For example, referring to FIG. 5, a knee airbag 100 can include a cushion portion 102 with first and second bends 104, 106 formed by first and second tethers 110, 112, respectively. The bends 104, 106 define first, second, and third segments 120, 122, 124 of the cushion portion 102. This can be done, for example, so that cushion portion 102 follows the contour of the instrument panel 130. In this configuration, the first segment 120 can follow the contour of a first portion 140 of the instrument panel 130. The second segment 122 can follow the contour of a second portion 142 of the instrument panel 130. The third segment 124 can follow the contour of a third portion 144 of the instrument panel 130.

Figure 5:
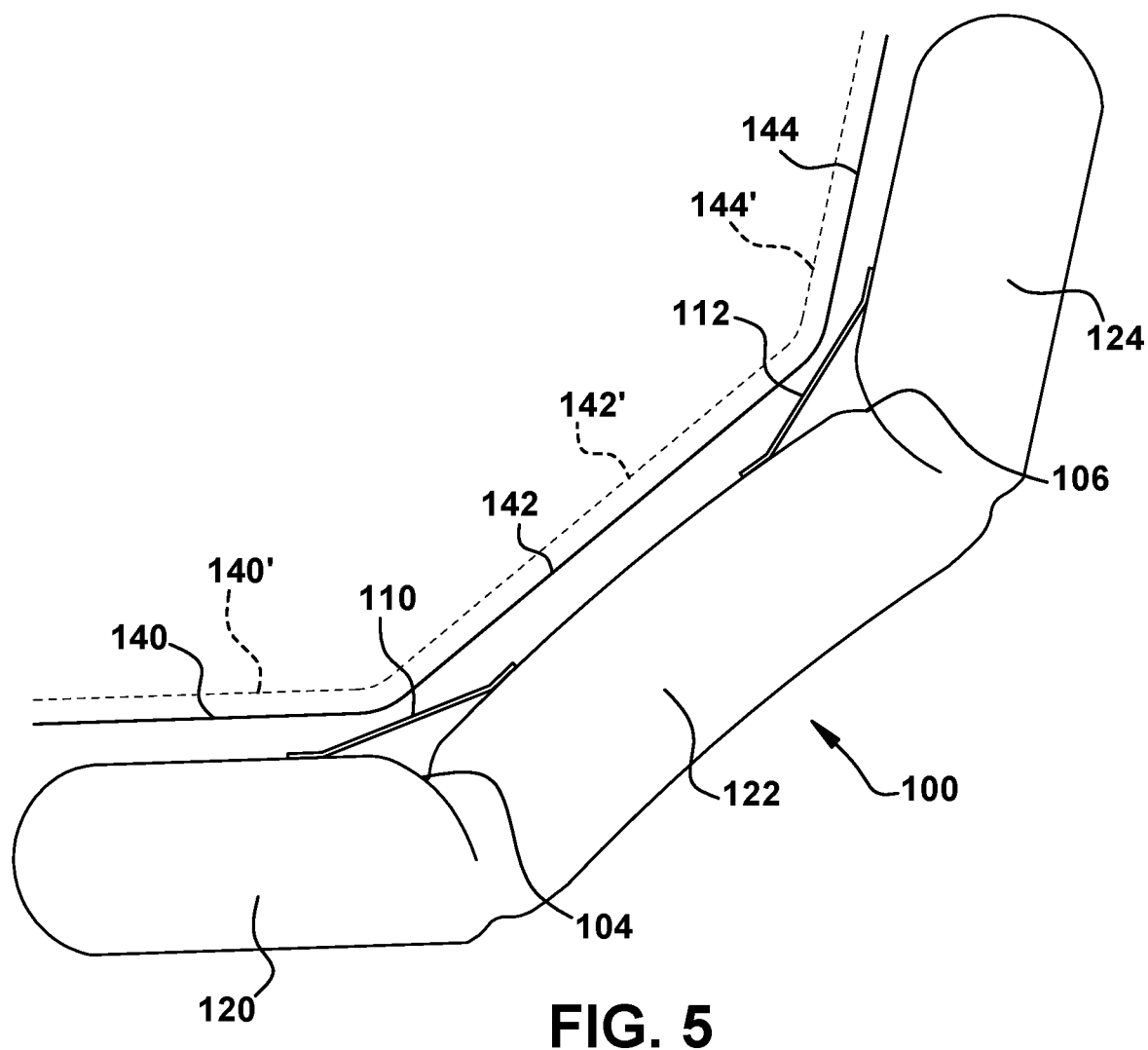
FIG. 5 is a side view of a knee airbag according to another example configuration.

As with the example configuration of FIGS. 1-4, for the example configuration of the knee airbag 100 in FIG. 5, the manner in which the segments 120, 122, 124 of the cushion portion 102 follow their respective portions 104, 142, 144 of the instrument panel 130 does not necessarily correspond exactly or precisely with the contour of the instrument panel. The cushion portion 102 does, however, follow the contour of the instrument panel 130 in a manner sufficient to maintain a close spacing sufficient to ensure that the knee airbag 100 can inflate and deploy completely, without being blocked or otherwise obstructed, such as by an occupant positioned close to the instrument panel at the time of deployment.

Advantageously, through the configuration of the tethers 110, 112, the knee airbag 100 can be configured to follow the contour of the instrument panel 20. As shown in FIG. 5, the bends 104, 106 produced by the tethers 110, 112 cause the first segment 120 of the cushion portion 102 to follow the first portion 140 of the instrument panel 130, the second segment 122 of the cushion portion 102 to follow the second portion 142 of the instrument panel, and the third segment 124 of the cushion portion 102 to follow the third portion 144 of the instrument panel. The bend 104 is positioned where the first and second portions 140, 142 meet each other. The bend 106 is positioned where the second and third portions 142, 144 meet each other.

The manner in which the segments 120, 122, 124 of the cushion portion 102 follow their respective portions 140, 142, 144 of the instrument panel 130 does not necessarily correspond exactly or precisely with the contour of the instrument panel. The cushion portion 102 does, however, follow the contour of the instrument panel 130 in a manner sufficient to maintain a close spacing sufficient to ensure that the knee airbag 100 can inflate and deploy completely, without being blocked or otherwise obstructed, such as by an occupant positioned close to the instrument panel at the time of deployment.

Additionally, the contour of the instrument panel 20 need not necessarily include distinct portions 140, 142, 144 that are essentially flat and extend at an angle with each other. For instance, referring to FIG. 5, the instrument panel can have a curved contour as shown in dashed lines at 130'. In this instance, the portions covered by the segments 120, 122, 124 can be portions 140', 142', 144' of the curved contour of the instrument panel 130'. In this instance, the portions 140', 142', 144' of the curved contour of the instrument panel 130' can be defined or delineated by the bends 110, 112 in the cushion portion 102.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A knee airbag comprising:
   a cushion portion configured to be inflated and deployed from a stored condition into a vehicle footwell, and to extend from the footwell upward along an occupant facing surface of an instrument panel, the cushion portion comprising overlying panels interconnected along a perimeter connection to define an inflatable volume of the knee airbag, and interconnected within the perimeter connection along one or more interior connections that define inflatable chambers within the inflatable volume, wherein the interior connections and the chambers are configured to extend along a longitudinal dimension of the cushion portion, wherein the knee airbag is configured so that the longitudinal dimension of the cushion portion extends vertically in the vehicle when inflated; and
   a tether connected to an exterior surface of the cushion portion at spaced locations, wherein the tether has a length that is shorter than the distance between the locations on the cushion portion to which the tether is connected, wherein the tether comprises a sheet of material having a width extending across the inflatable chambers, the tether being connected to the cushion portion along tether connections that extend widthwise across the tether, transverse to the lengths of the chambers;
   wherein the tether is configured to become tensioned in response to inflation of the cushion portion and causing a bend to form in the cushion portion, the bend being transverse to the length of the chambers.

2. The knee airbag recited in claim 1, wherein the tether is configured to form the bend transverse to the longitudinal dimension of the cushion portion.

3. The knee airbag recited in claim 1, wherein the cushion portion comprises a front panel configured to face the occupant and a rear panel configured to face the instrument panel, wherein the exterior surface to which the tether is connected is an exterior surface of the rear panel.

4. The knee airbag recited in claim 3, wherein the cushion portion has a generally rectangular configuration and wherein the interior connections interconnect the front and rear panels to form the chambers.

5. The knee airbag recited in claim 3, wherein the cushion portion has a one-piece woven construction in which the front and rear panels are woven simultaneously, with the perimeter connection and interior connections being defined by interwoven portions of the front and rear panels.

6. The knee airbag recited in claim 3, wherein the cushion portion has an assembled construction in which the front and rear panels are separately woven panels that are interconnected along the perimeter and interior connections by at least one of stitching, welding, and adhesive connections.

7. The knee airbag recited in claim 1, wherein the bend in the cushion portion is configured so that the cushion portion follows a contour of the instrument panel.

8. The knee airbag recited in claim 7, wherein the bend in the cushion portion defines first and second segments of the cushion portion on opposite sides of the bend that extend at an angle to each other, wherein the bend is configured so that the first segment follows a first portion of the instrument panel, and the second segment follows a second portion of the instrument panel.

9. The knee airbag recited in claim 8, wherein the first and second portions of the instrument panel are generally flat surfaces of the instrument panel that extend at an angle to each other.

10. The knee airbag recited in claim 8, wherein the first and second portions of the instrument panel comprise portions of a curved surface of the instrument panel.

11. The knee airbag recited in claim 8, wherein the bend is configured to be positioned where the first and second portions of the instrument panel meet.

12. The knee airbag recited in claim 1, wherein the tether is a first tether and the bend is a first bend, and wherein the knee airbag further comprises a second tether connected to the exterior surface of the cushion portion at spaced locations, wherein the second tether has a length that is shorter than the distance between the locations on the cushion portion to which the second tether is connected, and wherein the second tether is configured to become tensioned when the cushion portion is inflated and to form a second bend in the cushion portion spaced from the first bend.

13. The knee airbag recited in claim 12, wherein the first and second bends in the cushion portion are configured so that the cushion portion follows a contour of the instrument panel.

14. The knee airbag recited in claim 13, wherein the first and second bends in the cushion portion define first, second, and third segments of the cushion portion that extend at an angles to each other, wherein the bends are configured so that the first segment follows a first portion of the instrument panel, the second segment follows a second portion of the instrument panel, and the third segment follows a third portion of the instrument panel.

15. A knee airbag module comprising:
   the knee airbag recited in claim 1;
   an inflator for inflating the knee airbag; and
   a housing for supporting the knee airbag and inflator, the housing comprising an opening through which the knee airbag deploys;
   wherein the housing is configured to be mounted in a vehicle instrument panel in the area of a footwall of the vehicle.

16. A vehicle safety system comprising the knee airbag module recited in claim 15, a sensor configured to sense the occurrence of an event for which deployment of the knee airbag is desired, and a controller configured to actuate the inflator to deploy the knee airbag in response to the sensor.

17. The knee airbag recited in claim 1, wherein the cushion portion is configured so that the inflatable chambers extend linearly if inflated without influence of the tether.

\* \* \* \* \*